United States Patent

Tsuji

[11] Patent Number: 5,967,830
[45] Date of Patent: Oct. 19, 1999

[54] CONNECTOR

[75] Inventor: Takeshi Tsuji, Yokkaichi, Japan

[73] Assignee: Sumitomo Wiring Systems, Ltd., Japan

[21] Appl. No.: 08/890,815

[22] Filed: Jul. 11, 1997

[30] Foreign Application Priority Data

Jul. 12, 1996 [JP] Japan ................................. 8-183552

[51] Int. Cl.[6] ............................................. H01R 13/28
[52] U.S. Cl. ......................................... 439/470; 439/467
[58] Field of Search ................................. 439/470, 467, 439/466, 465, 473, 461, 462, 455, 453

[56] References Cited

U.S. PATENT DOCUMENTS

| 5,080,614 | 1/1992 | Utgaren | 439/462 |
| 5,422,437 | 6/1995 | Schnell | 174/65 R |
| 5,442,138 | 8/1995 | Ochi | 439/206 |
| 5,444,182 | 8/1995 | Hoshino | 174/72 C |
| 5,762,520 | 6/1998 | Martin | 439/470 |
| 5,839,911 | 11/1998 | Dinkel | 439/470 |

FOREIGN PATENT DOCUMENTS

| 335 001 | 2/1977 | Australia . |
| 0 080 813 | 6/1983 | European Pat. Off. . |
| 2-227973 | 9/1990 | Japan . |

*Primary Examiner*—Paula Bradley
*Assistant Examiner*—Antoine Nganajui
*Attorney, Agent, or Firm*—Anthony J. Casella; Gerald E. Hespos; Ludomir A. Budzyn

[57] ABSTRACT

A cover 20 is formed with an elastically deformable lock portion 27 which locks a corrugated protection tube 30 to restrict a loose displacement of the corrugated tube 30 along its longitudinal direction. The corrugated tube 30 is mounted as follows. First, the corrugated tube 30 is moved along its longitudinal direction with respect to the tubular cover 20 already mounted on the connector housing 10, and is inserted into the cover 20 from behind. Then, the lock portion 27 is elastically deformed, thereby permitting the insertion. When reaching a specified lock position, the corrugated tube 30 is locked by the lock portions 27, completing the mounting. Since the corrugated tube 30 needs not be positioned with respect to the lock portions 27 when being mounted, this connector has a better operability.

9 Claims, 4 Drawing Sheets

CONNECTOR

BACKGROUND OF THE INVENTION

1. Field of the Invention

The present invention relates to a connector which protects wires coming out of a connector housing by a cover.

2. Description of the Prior Art

A prior art connector is shown in FIG. 7, and includes a connector housing 1 for accommodating terminals (not shown) inside. Wires 2 come out of the connector housing 1 through its rear end surface. A protection tube 3 surrounds the wires 2, and a tubular cover 4 is mounted on a rear end portion of the connector housing 1 to surround exposed portions of the wires 2 between the connector housing 1 and the protection tube 3. A loose displacement of the protection tube 3 along its longitudinal direction is restricted by locking the protection tube 3 in the cover 4.

The prior art cover 4 is formed such that two half pieces 4a having a semicylindrical configuration are connected via a hinge 4b. At a front part of the cover 4 is formed an engaging portion 4c to be engaged with the connector housing 1. At a rear part of the cover 4 is formed a lock portion 4d which is corrugated to be engageable with circumferentially extending recesses and projections formed in the outer surface of the protection tube 3.

To mount the prior art cover 4, one of the two half pieces 4a, in their opened state, is partly engaged with the connector housing 1, and a front end part of the protection tube 3 is partly engaged with the lock portion 4d of this half piece 4a. The half pieces 4a then may be closed and locked by an unillustrated lock member. In this way, the prior art cover 4 is assembled into a tubular form and is mounted on the connector housing 1. Additionally the protection tube 3 is mounted on the cover 4 in such a manner that its loose displacement with respect to the cover 4 is restricted. In this way, the assembling is completed.

The above prior art connector has a poor operability because the protection tube 3 needs to be positioned with respect to the lock portion 4d when being mounted on the cover 4.

The present invention was developed in view of the above problem and an object thereof is to improve operability when a protection tube is mounted on a cover.

SUMMARY OF THE INVENTION

According to the invention, there is provided a connector in which wires come out of a connector housing through a end surface, a substantially tubular cover is mounted on an end portion of the connector housing and a protection tube is mounted on an end portion of the cover. The cover is provided with at least one elastically deformable lock portion. Elastic deformation of the lock portion permits the insertion of a portion of the protection tube into the cover along the longitudinal direction of the protection tube. This insertion brings the lock portion into engagement with the protection tube to hold the protection tube while restricting its loose displacement along its longitudinal direction and/or radial direction.

Insertion of the protection tube into the tubular cover substantially along its longitudinal direction is permitted by the elastic deformation of the lock portion. When the protection tube reaches a specified position, the lock engages the outer surface of the protection tube. As a result the protection tube is mounted such that loose displacement with respect to the cover along its longitudinal and/or radial direction is restricted. The inventive connector has a good operability because the protection tube can be mounted on the cover only by being inserted.

According to a preferred embodiment, the lock portion is formed such that its free ends extend obliquely inward along the insertion direction of the protection tube from its supported end on the inner surface of the cover. Thus the lock portion can smoothly undergo an elastic deformation in its outward direction as the protection tube is inserted. However, an attempt to move the inserted protection tube in the withdrawal direction generates forces on the lock portion that deform the lock portion inwardly to press the lock portion against the outer surface of the protection tube. Accordingly, the lock portion is not disengaged from the protection tube. Thus, the lock portion can make the insertion of the protection tube smoother and, at the same time, prevent the disengagement of the protection tube.

Preferably, the lock portion is formed with cover engaging means for engaging the protection tube, wherein the cover engaging means preferably comprises at least one projection and at least one recess interacting with at least one groove and at least one projection of the protection tube, respectively. Thus cover engaging means mating to the protection tube are provided in the cover.

At least one lock portion may comprise an inwardly projecting portion having both ends supported on the cover. The inwardly projecting portion may be shaped like a triangle or an embossment.

The lock portion may comprise an arcuate portion having a radius of curvature substantially corresponding to that of the protection tube, in particular of one or more grooves thereof, wherein the arcuate portion is preferably substantially concentrically arranged with an opening of the cover, through which the protection tube is inserted into the cover.

According to a further preferred embodiment, the protection tube substantially surrounds the wires and is mounted on the end portion of the cover. Thus portions of the wires coming out of the connector housing are protected by the cover and the protection tube.

Preferably, the lock portion is brought into engagement with the outer surface of the protection tube.

Further preferably, the lock portion is formed such that there is formed a drain hole in the cover.

Still further preferably, the cover comprises two half pieces being lockable with each other by locking means.

Most preferably, the two half pieces have substantially the same configuration in rotationally inverted positions about an axis.

According to a further preferred embodiment, there is provided a connector in which wires come out of a connector housing through its rear end surface, a tubular cover is mounted on a rear end portion of the connector housing to surround the wires and a protection tube surrounding the wires is mounted on a rear end portion of the cover to protect the portions of the wires coming out of the connector housing by the cover and the protection tube. In this embodiment, the cover is provided with an elastically deformable lock portion, so that the elastic deformation of the lock portion permits the insertion of the protection tube into the cover along its longitudinal direction and brings the lock portion into engagement with the outer surface of the protection tube to hold the protection tube while restricting its loose displacement along its longitudinal direction.

These and other objects, features and advantages of the present invention will become more apparent upon a reading of the following detailed description and accompanying drawings.

DETAILED DESCRIPTION OF THE PREFERRED EMBODIMENTS

Figure 1:
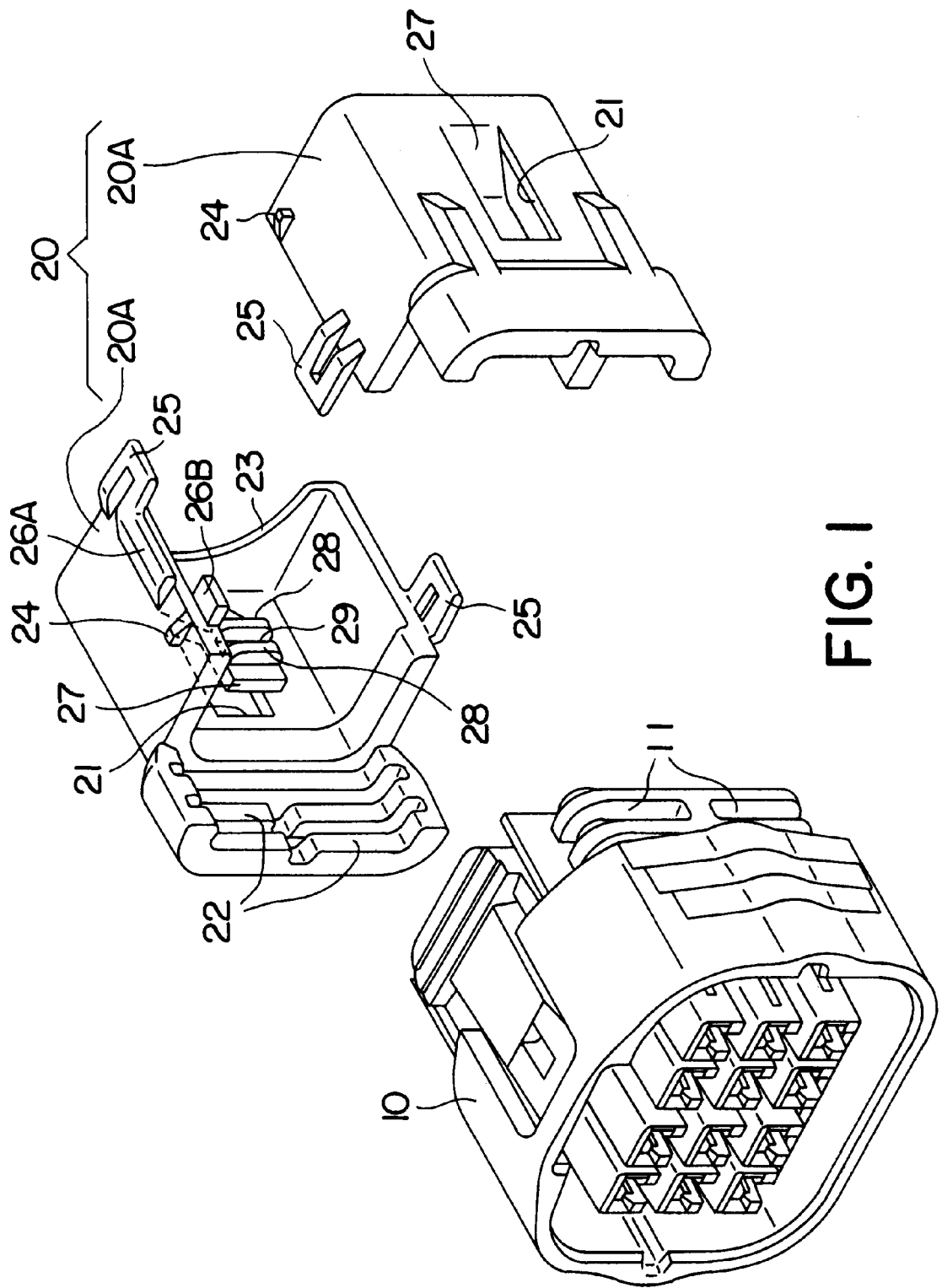
FIG. 1 is an exploded perspective view of a first embodiment.
Figure 2:
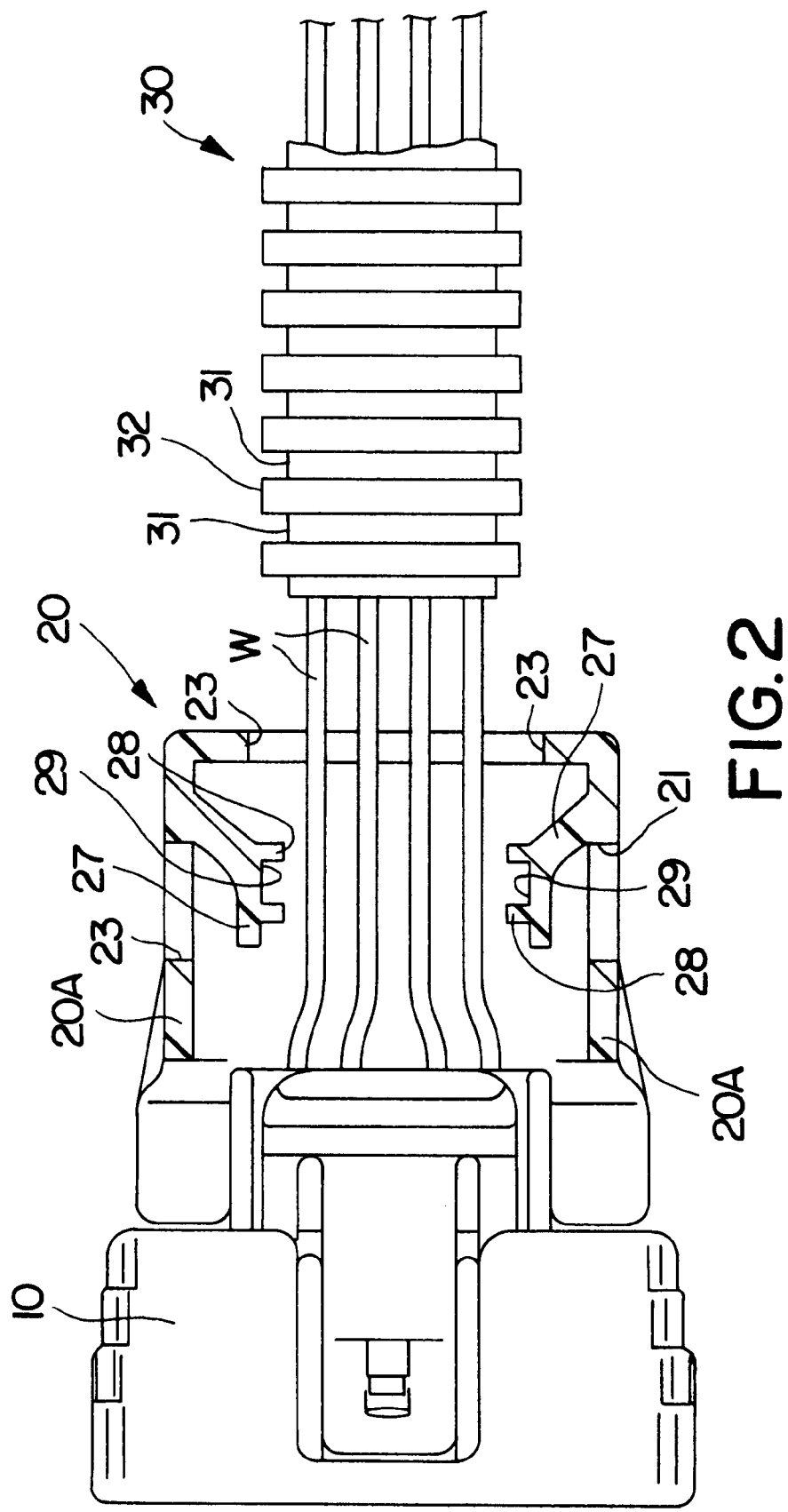
FIG. 2 is a section of the first embodiment before a corrugated tube is mounted.

A connector according to a first embodiment of the invention is illustrated in FIGS. 1–4. The connector of the first embodiment comprises a connector housing 10 accommodating terminals (not shown) inside, a cover 20 to be mounted on a rear end portion of the connector housing 10, and a corrugated tube 30 (protection tube) to be mounted on the cover 20.

In the outer surface of the rear end portion of the connector housing 10 are formed mount grooves 11 for mounting the cover 20. A plurality of wires connected with the terminals come out of the connector housing 10 through its rear end surface.

The corrugated tube 30 is preferably mounted in advance to movably surround the wires W coming out of the connector housing 10 along its longitudinal direction. The corrugated tube 30 has circumferentially extending grooves 31 and projections 32 alternately formed in its outer surface, and is deformable in such a manner as to curve its longitudinal axis. By being surrounded by such a corrugated tube 30, the wires W are protected without being exposed. Lock portions 27 of the cover 20, to be described later, are to be engaged with the grooves 31 and the projections 32 of the corrugated tube 30.

The cover 20 is comprised of a pair of half pieces 20A having preferably a substantially semicylindrical configuration. When being mounted on the connector housing 10, the pair of half pieces 20A are assembled into a tubular form as a whole and protect the portions of the wires W coming out of the connector housing 10 by substantially surrounding them.

The pair of half pieces 20A preferably have the same configuration and are assembled in rotationally inverted positions about an axis. In the inner surface of a front end portion of each half piece 20A are formed mount portions 22 which are engageable with the corresponding mount grooves 11 of the connector housing 10. At a rear end portion of each half piece 20A is formed a preferably semicircular notch 23 used for the insertion of the corrugated tube 30. The shape of the notch or opening 23 is adapted or corresponds to the shape of the corrugated tube 30. A lock projection 24 and a lock portion 25 are formed on each of the contact edges of the half pieces 20A which are to abut against each other. In the assembled state of the half pieces 20A, the lock projection 24 and the lock portion 25 of one half piece 20A are engaged with their counterparts of the mating half piece 20A. On one contact edge of the half piece 20A are formed engaging projections 26A, 26B for holding the other contact edge of the mating half piece 20A from opposite sides in inward and outward directions. In the assembled state, the half pieces 20A are locked in their tubular state by the engagement of the lock projections 24 and the lock portions 25 and by the engagement of the engaging projections 26A, 26B and the contact edges of the mating half pieces 20A.

Each half piece 20A is formed with the lock portion 27 for holding the corrugated tube 30 mounted. The lock portion 27 is formed such that its free end extends from its supported end on the inner surface of the half piece 20A so as to be elastically deformable in radial and/or axial directions. The lock portion 27 extends obliquely inwardly toward the front from a position near its rear end (an end where the corrugated tube 30 is inserted). At the free end of the lock portion 27 are formed at least one projection 28 and/or at least one recess 29 to be engaged with the groove 31 and the projections 32 of the corrugated tube 30. The projection 28 and/or the recess 29 preferably are formed circumferentially. When they are engaged, the projections 28 and the recess 29 are locked along the longitudinal direction of the corrugated tube 30, thereby restricting a loose displacement of the corrugated tube 30 with respect to the cover 20 along its longitudinal direction.

After the formation of the lock portion 27 e.g. by plastically inwardly deforming a portion of the cover 20, an opening is left in one side surface of the half piece 20A. This opening acts as a drain hole 21 for draining water within the cover 20 when the pair of half pieces 20A are assembled into a tubular form.

The connector of this embodiment is used by causing the wires W to come out of the connector housing 10 through its rear end surface. Portions of the wires W rearwardly of the connector housing 10 are surrounded by the corrugated tube 30. In this state, the cover 20 is first mounted on the connector housing 10. At this time, the corrugate tube 30 is positioned behind the cover 20. Specifically, while the mount portions 22 are engaged with the mount grooves 11 of the connector housing 10, the lock portions 25 are elastically deformed to be engaged with the lock projections 24, and the engaging projections 26A, 26B hold the contact edges of the mating half pieces 20A. In this way, the pair of half pieces 20A are assembled into the tubular cover 20 and, at the same time, the cover 20 is mounted on the rear end portion of the connector housing 10. The mounted cover 20 protects the portions of the wires W coming out of the connector housing 10 by surrounding them.

Figure 3:
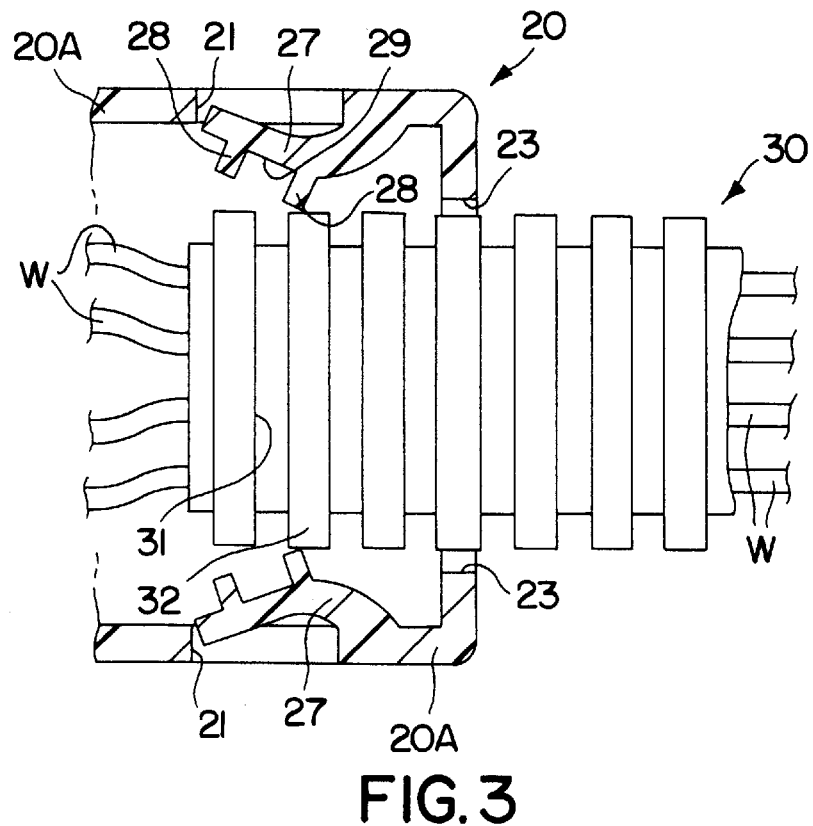
FIG. 3 is a partial section of the first embodiment during the mounting of the corrugated tube.
Figure 4:
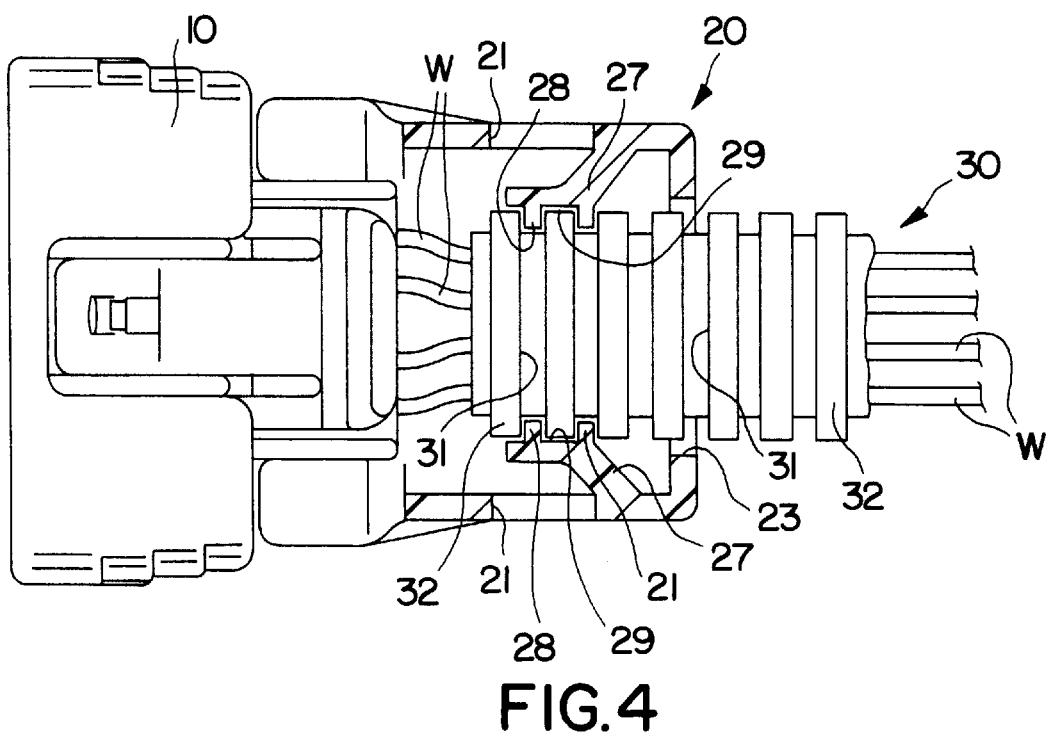
FIG. 4 is a section of the first embodiment when the corrugated tube is mounted.

Next, the corrugated tube 30 is fitted to the cover 20. This operation is done by moving the corrugated tube 30 forward along its longitudinal direction and inserting it into the cover 20 through the notches 23 in the rear end surface of the cover 20. Then, a pair of lock portions 27 inside the cover 20 are elastically deformed outwardly by being pressed by the outer surface of the corrugated tube 30 as shown in FIG. 3, with the result that the projections 28 of the lock portions 27 move over the projection 32 of the corrugated tube 30. In other words, the corrugated tube 30 can be smoothly inserted by the elastic deformation of the lock portions 27. The insertion is stopped when the corrugated tube 30 reaches a proper lock position. Then, the lock portions 27 engage the outer surface of the corrugated tube 30 due to their elastic restoring forces. In this way, the mounting of the corrugated tube 30 is completed. In this state, the projections 28 and the recesses 29 of the lock portions 27 are locked with the groove 31 and the projection 32 of the corrugated tube 30 along the longitudinal direction of the corrugated tube. Thus the corrugated tube 30 is held such that its loose displacement with respect to the cover 20 along its longitudinal direction is restricted.

With the corrugated tube 30 mounted on the cover 20, the wires W are surrounded by any one of the connector housing 10, the cover 20 and the corrugated tube 30 over substantially their entire length so as to not be exposed to the outside.

As described above, in this embodiment, by making the lock portions 27 elastically deformable, the corrugated tube 30 can be mounted only by moving the corrugated tube 30 along its longitudinal direction and inserting it into the cover 20. Accordingly, a cumbersome operation of positioning the corrugated tube 30 with respect to the lock portions 27 in advance can be omitted, thereby improving operability.

Further, an operation of assembling the half pieces 20A into the tubular cover 20 and an operation of mounting the corrugated tube 30 on the cover 20 are performed separately. This connector can be assembled more easily as compared to a connector in which a cover is mounted on a connector housing after a corrugated tube is partly locked with a lock portion so as not to displace.

Further, each lock portion 27 is formed such that its free end extends preferably obliquely inwardly along the insertion direction of the corrugated tube 30 from its supported end on the inner surface of the cover 20. Accordingly, the lock portions 27 can smoothly undergo an elastic deformation in their outward directions by being pressed by the outer surface of the corrugated tube 30 being inserted. Thus, the corrugated tube 30 can be satisfactorily and easily inserted. Alternatively the lock portion 27 may extend vertically and be deflectable along an axial direction and a radial direction, so as to allow the insertion or fitting of the corrugated tube 30 into the cover 20. Furthermore there might be provided two or more lock portions 27 in the cover 20.

However, upon an attempt to withdraw the corrugated tube 30 locked by the lock portions 27, the projection 32 of the corrugated tube 30 presses the projections 28 of the lock portions 27 along the longitudinal direction of the corrugated tube 30, with the result that a force acts on the lock portions to deform them in their inward directions. Accordingly, the projections 32 and 28 cannot be disengaged and the corrugated tube 30 cannot move in its withdrawal direction.

In other words, by forming the lock portions 27 such that their free ends extend obliquely inwardly toward the front, the corrugated tube 30 can be more smoothly inserted and the disengagement thereof can be securely prevented.

Further, according to this embodiment, the cover 20 is formed by assembling the pair of half pieces 20A having the same configuration in rotationally inverted positions about an axis. Accordingly, as compared to a connector in which a cover is formed by assembling two types of parts having different configurations, production costs can be reduced and storage and handling can be made easier.

Furthermore, since the openings left in the side walls of the cover 20 after the formation of the lock portions 27 can be utilized as drain holes 21, as compared to a case where such openings and drain holes are separately formed, a total open area of the cover 20 is smaller. Thus, the strength of the cover 20 can be enhanced.

Figure 5:
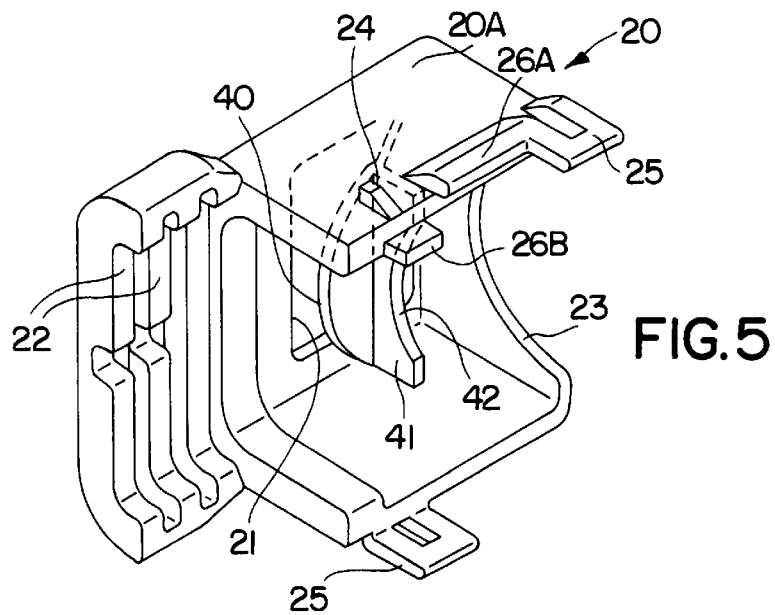
FIG. 5 is a perspective view of a cover according to a second embodiment.

A second embodiment, as illustrated in FIG. 5, differs from the first embodiment in the construction of the lock portions. Since the other constructions are similar to those of the first embodiment, no description is given on such constructions, and action and effects thereof by identifying them by the same reference numerals.

A lock portion of the second embodiment is similar to the lock portion 27 of the first embodiment and is formed such that its free end extends obliquely inward toward the front from its supported end on the inner surface of the half piece 20A of the cover 20. On the rear end of the lock portion 40 is formed a plate-like projection 41 projecting inward at an angle different from 0° or 180°, preferably at a substantially right angle to the longitudinal direction of the half piece 20A. At a projecting end of the projection 41 is formed an arcuate portion 42 having substantially the same radius of curvature as the grooves 31 of the corrugated tube 30 (not shown in FIG. 5). The arcuate portions 42 preferably are arranged concentrically with a substantially circular opening or notch 23 formed in the rear end surface of the cover 20. The projection 41 preferably is provided on a tongue-shaped portion of the cover 20, projecting inwardly at an angle different from 0° or 180° with respect to the wall(s) of the cover 20.

When the corrugated tube 30 is inserted into the cover 20 provided with such lock portions 40, the insertion thereof can be smoothly performed by the elastic deformation of the lock portions 40. The projection 32 of the inserted corrugated tube 30 is locked with the projections 41 along the longitudinal direction of the corrugated tube, thereby restricting a loose displacement of the corrugated tube 30 along its longitudinal direction. Further, the arcuate portions 42 of the projections 41 are engaged with the groove 31, thereby restricting a loose displacement of the corrugated tube 30 with respect to the cover 20 along radial directions, particularly along vertical direction of FIG. 5. There is, accordingly, no likelihood that the corrugate tube 30 is radially displaced and disengaged from the locking portions 40. Thus, the corrugated tube 30 can be securely held mounted on the cover 20.

Figure 6:
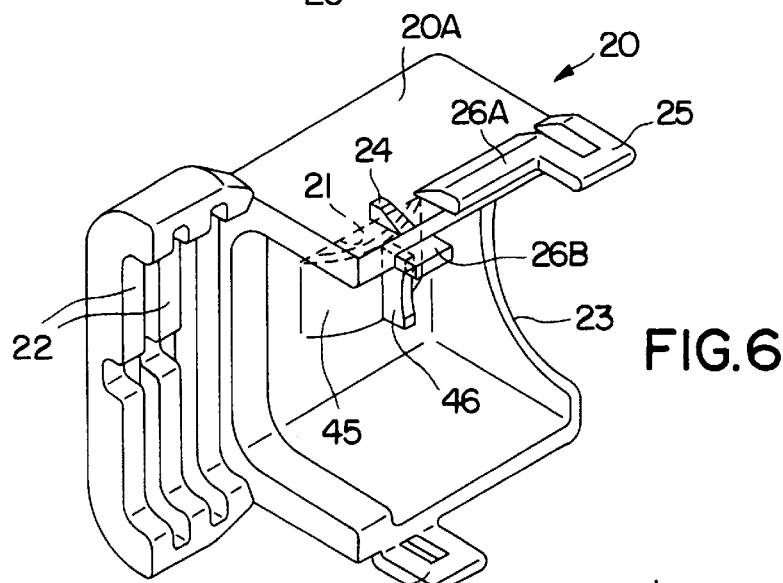
FIG. 6 is a perspective view of a cover according to a third embodiment.
Figure 7:
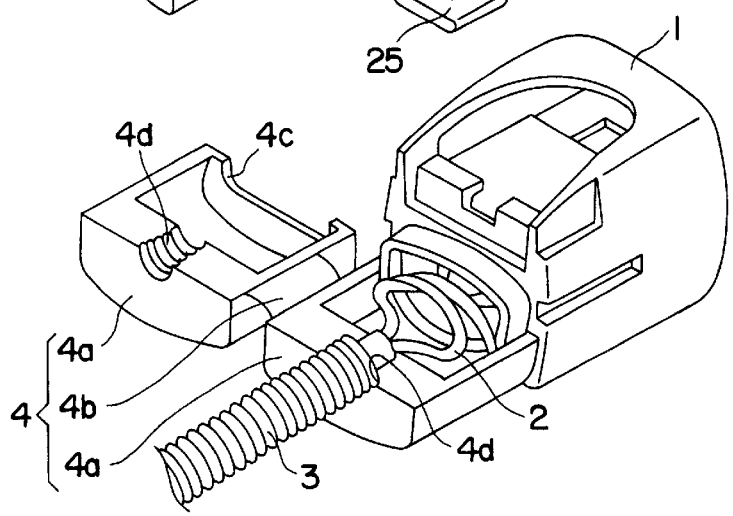
FIG. 7 is an exploded perspective view of a prior art connector.

A third embodiment, as illustrated in FIG. 6, differs from the first embodiment in the construction of the lock portions. Since the other constructions are similar to those of the first embodiment, no description is given on such constructions, and action and effects thereof by identifying them by the same reference numerals.

Unlike the lock portions 27, 40 of the first and second embodiments which are supported only at one end, a lock portion of the third embodiment is made elastically deformable with both ends thereof supported. The lock portion 45 is narrow along forward and backward directions (a direction parallel to the insertion direction of the corrugated tube 30); has its front and rear ends supported on the half piece 20A of the cover 20; and projects inwardly from the inner surface of the half piece 20A along a moderately curved arc. A projection 46 projecting inwardly is formed preferably in a substantially middle position of the lock portion 45 along forward and backward directions. The projections 46 are engaged with the groove 31 of the corrugated tube 30 (not shown in FIG. 6) to be locked with the projection 32 along the longitudinal direction of the corrugated tube 30, thereby restricting a loose displacement of the corrugated tube 30 with respect to the cover 20 along its longitudinal direction.

In a position of one side wall of the half piece 20A corresponding to the lock portion 45, there is left an opening after the formation of the lock portion 45. This opening acts as a drain hole 47.

Since the lock portion 45 is supported at its both ends according to the third embodiment, a larger force is required to deform it. Accordingly, even upon a force acting in the withdrawal direction of the corrugated tube 30 or in a transverse direction thereof (direction in which the lock portion 45 is deformed), the lock portion 45 is unlikely to be deformed. Thus, the displacement of the corrugated tube 30 in its withdrawal and/or transverse directions can be securely hindered.

The present invention is not limited to the described and illustrated embodiments. For example, the invention also is applicable to a connector provided with a single piece tubular cover or a connector provided with a cover formed by connecting two half pieces by a hinge. Converse to the first embodiment, the lock portion supported only on its one end may be formed such that its free end extends obliquely inward in the withdrawal direction of the corrugated tube or obliquely inward in the upward or downward direction of FIG. 1. Although the lock portions are provided inside the cover in the foregoing embodiments, according to the invention, they may be provided at the outside of the cover, i.e. their free ends may extend rearward from the rear end surface of the cover. Although the corrugated tube is used as a protection tube in the foregoing embodiments, the invention is applicable also in a case where the protection tube is other than the corrugated tube. Although the lock portions have their front and rear ends supported (ends along the insertion direction of the corrugated tube) according to the third embodiment, their upper and lower ends of FIG. 6 may be supported according to the invention. An arcuate portion may be formed in the projection of the lock portion of the third embodiment as in the second embodiment. The projection tube 30 may be used for preventing (or protecting from) a too strong bending or damage of the wires W at the opening 23, and may be formed with circumferentially spaced openings (not shown) allowing for its radial bending (outside of the cover 20). The protection tube 30 may be arranged on only a portion of the wires W and not only over their substantially entire length outside the connector 10 and the cover 20. These and other variations of the subject connector are considered to be within the scope of the invention as defined by the appended claims.

What is claimed is:

1. A connector comprising a connector housing having an end surface with wires projecting therefrom, a substantially tubular cover mounted on an end portion of the connector housing and a protection tube mounted on an end portion of the cover, the cover being provided with at least one elastically deformable lock portion dimensioned and configured such that elastic deformation of the lock portion permits insertion of a portion of the protection tube into the cover along a longitudinal direction of the protection tube and brings the lock portion into engagement with the protection tube to hold the protection tube and to restrict loose displacement of the protection tube the lock portion being formed with a free end extending obliquely inwardly along the insertion direction of the protection tube from a supported end on the inner surface of the cover.

2. A connector according to claim 1, wherein the protection tube substantially surrounding the wires is mounted on the end portion of the cover to substantially protect the portions of the wires coming out of the connector housing by the cover and by the protection tube.

3. A connector according to claim 1, wherein the lock portion is brought into engagement with the outer surface of the protection tube.

4. A connector according to claim 1, wherein the lock portion is formed such that there is formed a drain hole in the cover.

5. A connector comprising a connector housing having an end surface with wires projecting therefrom, a substantially tubular cover mounted on an end portion of the connector housing and a protection tube mounted on an end portion of the cover, the cover being provided with at least one elastically deformable lock portion dimensioned and configured such that elastic deformation of the lock portion permits insertion of a portion of the protection tube into the cover along a longitudinal direction of the protection tube and brings the lock portion into engagement with the protection tube to hold the protection tube and to restrict loose displacement of the protection tube, the at least one lock portion comprising an inwardly projecting portion having both ends non-deflectably supported on the cover.

6. A connector comprising a connector housing having an end surface with wires projecting therefrom, a substantially tubular cover mounted on an end portion of the connector housing and a protection tube mounted on an end portion of the cover, the cover being provided with at least one elastically deformable lock portion, dimensioned and configured such that elastic deformation of the lock portion permits insertion of a portion of the protection tube into the cover along a longitudinal direction of the protection tube and brings the lock portion into engagement with the protection tube to hold the protection tube and to restrict loose displacement of the protection tube, the lock portion comprising an arcuate portion, having a radius of curvature substantially corresponding to a radius of curvature of the protection tube.

7. A connector according to claim 6, wherein the arcuate portion is substantially concentrically arranged with an opening of the cover, through which the protection tube is inserted into the cover.

8. A connector comprising a connector housing having an end surface with wires projecting therefrom, a substantially tubular cover mounted on an end portion of the connector housing and a protection tube mounted on an end portion of the cover, the cover being provided with at least one elastically deformable lock portion, dimensioned and configured such that elastic deformation of the lock portion permits insertion of a portion of the protection tube into the cover along a longitudinal direction of the protection tube and brings the lock portion into engagement with the protection tube to hold the protection tube and to restrict loose displacement of the protection tube, the cover comprising two half pieces each said half piece having locking means for locking the half pieces with each other.

9. A connector according to claim 8, wherein the two half pieces have substantially the same configuration in rotationally inverted positions about an axis.

* * * * *